Patented Oct. 6, 1925.

1,556,248

UNITED STATES PATENT OFFICE.

CLARENCE H. OHLWILER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS-CLEANING PROCESS.

No Drawing.      Application filed December 20, 1920. Serial No. 432,141.

*To all whom it may concern:*

Be it known that I, CLARENCE H. OHLWILER, a citizen of the United States, residing at Southbridge, in the county of Worcester and State of Massachusetts, have invented certain new and useful Improvements in Lens-Cleaning Processes, of which the following is a specification.

This invention relates to a novel and improved process for suitably cleansing ophthalmic lenses and has for its principal object the provision of an improved process which may be readily and satisfactorily carried out and which will serve to satisfactorily remove adhering pitch or other blocking material from the lens and leave the surface of the lens in commercially clean and usable condition.

In the manufacture of ophthalmic lenses it is the custom to prepare a block or member for holding the lenses during the grinding operation from pitch or similar material and to then under the influence of heat mount the lenses upon the pitch, the pitch sufficiently adhering to the surface of the lenses to satisfactorily retain them in position on the block during the grinding of the free face thereof. After completion of the grinding it is customary to chill the block with attached lenses and with a suitable implement pick off or remove the lenses placing them in suitable boxes or retaining trays. It has then been the custom to agitate the trays containing the lenses in one or more baths under the action of soapy water in the attempt to properly cleanse the surfaces both from the abrasive and from the adhering pitch which has remained on the lens, breaking loose from the block. This, however, is a very slow process. The action of the soapy water is sometimes liable to damage the high polish on the surface of the lens and considerable wiping is frequently necessary before the lens can be properly cleaned.

It is the purpose of my invention to obviate these several difficulties by providing a novel and improved process of treating or cleaning the lenses which will insure their surfaces being free of all pitch and similar substance as well as all organic matter, but without injury to the high polish of said surfaces.

In the carrying out of my process, therefore, after the lenses have been picked from the pitch block and with the particles of pitch adhering, I mount the same in a suitable tray or holder formed from glass composition, aluminum or the like, which is not subject to the action of acid. The lenses having been thus mounted I first wash or rinse the same in hot creosote, the effect being that the hot creosote will dissolve and combine with the pitch forming a thin and much more soluble composition than is the pitch itself, and thoroughly softening up and removing adhering pitch from the lenses. After the lenses have been suitably subjected to the action of the hot creosote I transfer them to a washing solution consisting of benzol or similar suitable solvent, which will dissolve and remove the creosote. This solvent thoroughly cleanses the lenses from the pitch creosote composition but does not have a sufficiently strong dissolving action to affect pure pitch. The creosote having been to a large degree dissolved and removed by the benzol dip, I place the tray within concentrated sulphuric acid, which, as is well known, will remove all organic or animal matter from the lenses leaving them in what may be termed a chemically clean condition with absolutely clear surfaces requiring but slight wiping to be in highly polished salable condition.

After dipping in the sulphuric acid they may if desired be subjected to ordinary washing action in water or the like, if preferred.

In some instances I prefer to slightly vary the final acid bath, in that in place of making use of pure sulphuric acid solution, by the addition of sodium bichromate, or in any other well known manner, I prepare a solution of sulphuric chromic acid, which I find has certain points of merit over the plain sulphuric acid, the lenses being bathed in this and then subjected to a washing action to remove the acid therefrom.

I claim:

1. The process of cleansing lenses from a coal tar blocking compound consisting in subjecting the lenses to a creosote bath and to a second bath in sulphuric acid which will remove the composition formed by the first solvent.

2. The process of cleansing lenses from a blocking compound consisting in subjecting the lenses to a heavy coal tar distillate solvent bath and to a second acid solvent bath which will remove the composition formed by the first solvent, and removing the second solvent through the use of a final water bath.

3. The process of cleansing lenses from a coal tar blocking compound, consisting in subjecting the lenses to a bath in creosote and then to a bath in benzol.

4. The process of cleansing lenses from a coal tar blocking compound, consisting in subjecting the lenses to a bath in hot creosote and then to a bath in benzol.

5. The process of cleansing lenses from a coal tar compound consisting in subjecting the lenses to a series of baths in progressively lighter coal tar distillate and a final cleansing bath, rich in sulphuric acid.

6. The process of cleansing lenses from pitch and abrasive consisting in subjecting the pitched lenses to a heated heavy coal tar distillate to dissolve the pitch, removing the solution thus formed through the action of lighter coal tar distillates, and finally cleansing the lenses by a bath rich in sulphuric acid.

7. The process of removing blocking compound from lenses which have been secured for grinding through the use of a very heavy coal tar distillate consisting in removing the adhering distillate by subjecting the lens to baths in other progressively lighter coal tar distillates.

8. The process of cleansing lenses from a coal tar blocking compound, consisting in subjecting the lenses to a bath in creosote, then to a bath in benzol or equivalent, and then to a washing bath.

In testimony whereof I have affixed my signature.

CLARENCE H. OHLWILER.